No. 835,215. PATENTED NOV. 6, 1906.
G. H. COATES.
FLEXIBLE SHAFT.
APPLICATION FILED MAR. 16, 1905.

Witnesses
Roy D. Tolman.
Penelope Comberbach.

Inventor
George H. Coates.
By Rufus B. Fowler
Attorney.

UNITED STATES PATENT OFFICE.

GEORGE H. COATES, OF WORCESTER, MASSACHUSETTS.

FLEXIBLE SHAFT.

No. 835,215.  Specification of Letters Patent.  Patented Nov. 6, 1906.

Application filed March 16, 1905. Serial No. 250,426.

*To all whom it may concern:*

Be it known that I, GEORGE H. COATES, a citizen of the United States, residing at Worcester, in the county of Worcester and Commonwealth of Massachusetts, have invented a new and useful Improvement in a Flexible Shaft, of which the following is a specification accompanied by drawings forming a part of the same, in which—

Figure 1:
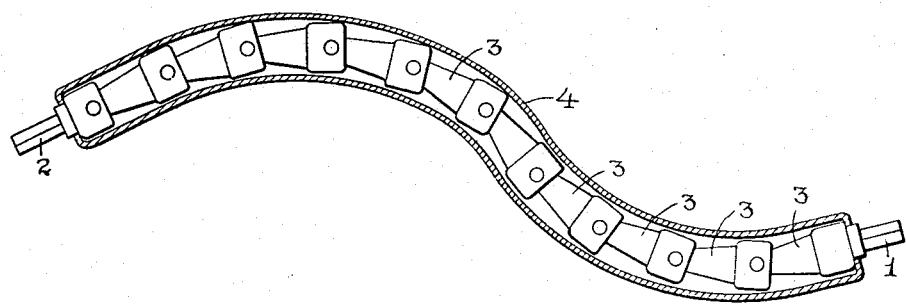
Figure 2:
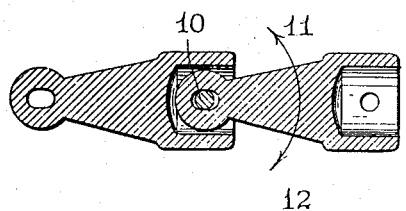
Figure 3:
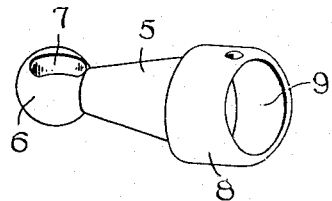
Figure 4:
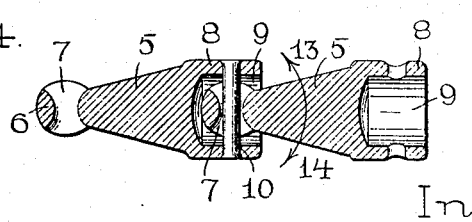

Figure 1 represents a side view of a flexible shaft embodying my invention, with the inclosing sheath or cover shown in sectional view. Fig. 2 is a central sectional view through two connecting links. Fig. 3 is a detached and perspective view of one of the links, and Fig. 4 is a central sectional view through two connected links on a plane at right angles to the section shown in Fig. 2.

Similar reference figures refer to similar parts in the different views.

It is the object of my present invention to provide a flexible shaft comprising a series of pivotally-connected links which are duplicates of each other, thereby reducing the expense of construction; and it consists in the construction and arrangement of parts, as hereinafter described, and pointed out in the annexed claims.

Referring to the accompanying drawings, 1 and 2 denote two squared spindles connected by a flexible shaft embodying my invention and composed of a series of pivoted links 3, inclosed in a sheath or cover 4, of any suitable material, such as is employed for this purpose in flexible shafts now in use. The links 3 are duplicates of each other and are so pivoted together at their ends that each link is capable of a rocking movement on its pivot in two planes at right angles to each other. Each link comprises a tapering body portion 5, having at its smaller end a spherical tip 6, provided with an elongated hole 7, and at its larger end a cylindrical extension 8, provided with a cylindrical socket 9. The cylindrical extension 8 carries a pivotal pin 10, extending diametrically through the socket 9 and passing through the elongated hole 7 of the next adjacent link. Each link is capable of a rocking motion around the axis of the pivotal pin 10 in the direction of the arrows 11 and 12, Fig. 2, and it is also capable, by means of the elongated hole 7, of a rocking motion in a plane parallel with the axis of the pin 10, as shown by the arrows 13 and 14, Fig. 4. The pivotal connection between each adjacent pair of links, therefore, forms a universal joint, so that a rotary motion transmitted to the spindle 1 will be communicated through the series of links 3 to the spindle 2. The links 3 are duplicates of each other and are pivotally connected by the simple insertion of the pin 10. The cost of construction is therefore materially reduced and the pivotal pins 10 are securely held in place by a slight upsetting or riveting of their ends.

What I claim as my invention, and desire to secure by Letters Patent, is—

1. The combination in a flexible shaft, of a series of duplicate links, each of said links having a socket at one end to receive the opposite end of the adjacent link, and a pivotal pin held in the socket end of the link there being an elongated hole in the pivoted end of the adjacent link to receive said pivotal pin.

2. The combination in a flexible shaft, of a series of duplicate links with their ends pivotally united, each of said links comprising a tapering body-section, with a cylindrical socket at one end and a spherical tip at its opposite end, there being an elongated hole in said spherical tip, and a pivotal pin carried by said cylindrical socket.

3. The combination in a flexible shaft, of a series of pivoted links each consisting of a single piece having at one end a tip provided with an elongated hole and a cylindrical socket at the opposite end adapted to receive said tip and means for pivotally connecting said links.

4. A flexible shaft consisting of a series of similar connected parts, each of said parts having at one end a cylindrical socket, and a pin held in said end and extending diametrically through said socket and the opposite end of said parts terminating in a spherical tip having a diametrical hole elongated at its ends and inclosing said pin.

GEORGE H. COATES.

Witnesses:
RUFUS B. FOWLER,
PENELOPE COMBERBACH.